United States Patent Office 2,889,883
Patented June 9, 1959

2,889,883

PROCESS FOR SEALING POROUS FORMATIONS

Arthur C. Santora, Kennett Square, Pa., assignor to E. I. du Pont de Nemours and Company, Wilmington, Del., a corporation of Delaware No Drawing. Application March 11, 1958
Serial No. 720,524

18 Claims. (Cl. 166—33)

This invention relates to a novel process for sealing porous underground formations which are permeable to water, and particularly to the use of novel sealing compositions in such process.

Porous underground formations can make drilling operations very difficult. When hydraulic rotary drilling is used, the expensive circulating drilling mud may escape into the porous regions around the bore hole or it may be diluted by water seeping in from a permeable formation. When pneumatic (vapor) rotary drilling is employed, entrance of even small amounts of water causes agglomeration of the fine particles (made by the drill bit) into larger lumps which cannot be entrained and removed by the air stream. When natural gas flows from porous strata into a well hole, it may cause blowouts and present a serious fire hazard.

Cement or cement slurries have been used as oil well sealants. However, cement does not penetrate porous underground strata of low permeability (e.g. less than a darcy) sufficiently to seal it satisfactorily even when great pressure is applied. The use of various resin-forming compositions and heardenable resin-containing compositions have been proposed for such purposes, but have not proved to be satisfactory. Particularly, it has been difficult or impossible to satisfactorily control the resinification and hardening of such compositions. In many cases, it is necessary to bring the composition containing the resin-forming material into contact with water (or another composition containing a second reactant or a catalyst) present in the formation or separately introduced into the formation. Also, many compositions, which are set-up by reaction with water, are quickly set-up by contact with the water in the formation so that they are prevented from penetrating the formation to the extent required to provide long-lasting sealing. Other compositions are diluted by the underground water and aqueous liquids which seriously affects their set-up time so that such time becomes unpredictable. When it is attempted to mix the reactants, such as the resin-forming material and the catalyst, before introducing them into the formation, there is a tendency for the mixture to rapidly become too viscous to be forced into the formation or to solidify before it reaches the formation. When it is attempted to overcome the latter difficulty by decreasing the amount of the catalyst, by employing a weak catalyst, or by employing much more diluent or solvent, the solid resin produced fails to completely fill and seal the pores of the formation, is weak and ineffective, or the solidification of the resin in the formation requires objectionably long periods of time, usually of the order of 1 to 7 days, resulting in corresponding long delays in the resumption of drilling or mining operations. Furthermore, since agitation cannot be provided in the formation, it is not possible to obtain complete and effective mixing of reactants separately introduced; whereby only a portion (usually a small proportion) of the resin-forming material is converted to the desired solid resin.

Fluids which react to produce a precipitate have been pumped sequentially into porous formations but they subsequently do not mix well enough to provide sufficient precipitate to seal the formation. Furthermore, such precipitates are not sufficiently cohesive to withstand the extreme pressures exerted by water attempting to pass through the formation and are soon washed out of the pores. Also, where precipitates are formed by hydrolysis, they are formed quickly and prevent sufficiently deep and effective penetration of the underground formation.

Some proposed compositions are useful only in formations having a relatively high temperature. Also, most sealing compositions yield resins which are hard and brittle and have insufficient strength to long withstand the pressures and stresses encountered in underground formations and do not add strength to the underground formations so as to prevent sloughing and caving, whereby their sealing effect is prematurely lost. Colloids, gels, or solid particles, present in some sealing compositions, prevent the compositions from penetrating the formation to the extent required to resist the tremendous pressures exerted by the underground water attempting to pass through the formation. Also, most sealants are subject to serious attack and corrosion by the strong aqueous acids found in underground formations and are soon destroyed by such acids. Furthermore, some sealants undergo shrinkage when they set-up and thereby fail to effectively close off the permeable underground regions.

Porous underground formations vary in permeability over a wide range. Formations which have very small pores exhibit such low permeability that they may be sealed by viscous liquids or jelly-like compositions. In the language of the trade the permeability of these regions might range from about 0.1 to several darcies. However, regions of high permeability (greater than 100 darcies), such as 20–40 mesh Ottawa sand or fractured limestone, are very difficult to seal by the processes available in the art.

It is an object of this invention to provide a novel porcess for sealing porous underground formations to prevent the passage of water and gas therethrough and which overcomes the disadvantages of the prior processes. Another object is to provide novel and more effective means for preventing inflow of water during an underground drilling or mining operation. A further object is to provide novel means for preventing loss of drilling mud to a porous formation. A preferred object is to facilitate the drilling of oil wells. A particular object is to provide a process of the above character which employs a novel, more efficient, and more effectively controllable sealing composition which produces a strong, non-brittle and long-lasting seal. Still other objects will appear hereinafter.

The above and other objects are accomplished by this invention which comprises sealing a porous underground formation which is permeable to water and is at a temperature T of from about 15° C. to about 90° C. by forcing into the pores of said formation a freshly prepared anhydrous solution having a Brookfield viscosity of up to 100 cps. at 25° C. and which solution consists essentially of (1) at least about 40% by weight of a polyisocyanate composition containing at least 6% by weight of free isocyanate groups as the sole groups reactible with alcoholic hydroxyl groups, said polyisocyanate composition consisting of at least one member of the class consisting of aromatic polyisocyanates and reaction products of an aromatic polyisocyanate with an aliphatic polyhydroxy compound having a molecular weight of from about 62 to about 4000 and containing at least 2 alcoholic hydroxyl groups and in which the sole groups reactible with isocyanate groups are hydroxyl groups, each molecule of said reaction products containing at least 2 free isocyanate groups; (2) for each 100 parts of said polyisocyanate composition from about 0.32 part to 0.32+(90.0−T) (0.0372) parts by weight of a phenol of the formula

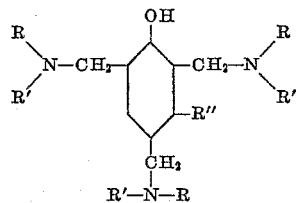

wherein R and R' represent at least one member of the group consisting of separate open-chain alkyl radicals of 1–8 carbon atoms and alkylene radicals of 4–5 carbon atoms which jointly with the nitrogen atom form a heterocyclic ring, the sum of the R and R' radicals containing a total of 6 to 24 carbon atoms, and R" represents a member of the group consisting of hydrogen and a methyl radical, the amount of said phenol being insufficient to cause the viscosity of the solution to rise above 100 cps. at 25° C. in 30 minutes; and (3) an inert liquid organic solvent having a flash point of at least 40° C. in an open cup at atmospheric pressure and which is a solvent for both the polyisocyanate composition and the phenol; and maintaining the solution in the pores of the formation until it has solidified.

By such process, the porous underground formation is effectively sealed even when the underground formation comprises a region of high permeability. The dialkylaminomethyl phenols of the recited class catalyze the conversion of the polyisocyanate composition to an infusible resin and the solution into a solid impermeable gel or mass which completely fills and seals the formation and which is tough, resilient, and somewhat elastic but sufficiently stiff so that it is strongly retained in the formation, effectively resisting the pressures and other stresses occurring in the formation, and strengthens the formation against sloughing and caving. Also, the solidified mass is resistant to the action of the gases and the aqueous fluids occurring in the formation as well as those used in drilling and mining operations. The formation of the resin and of the gel or mass is accomplished without the aid of water or other chain-extending or cross-linking agents. The catalysts are of such character that, by employing them in the specified range, they do not cause the viscosity of the solutions to increase to the point where they cannot be effectively pumped to the formation and forced into the pores thereof within the time required for such purposes, i.e. within about 30 minutes to about 2 hours. At the same time, the proportions of the ingredients of the sealing composition can be readily adjusted, particularly with regard to the temperature of the underground formation, so as to cause the composition to gel or harden in the formation within any desired time of from about 20 minutes up to about 24 hours.

When the need for sealing an underground porous permeable formation arises during hydraulic drilling of an oil well, the drill pipe is raised and removed. A packer (or drillable retainer) having a one-way valve is substituted for the drill bit. The assembly is lowered into the well and the packer (or retainer) is set in position at a point just above the porous region to be treated; often the packer (or retainer) is set just above the bottom of the casing but it may be positioned in the well hole below the casing. Preferably, oil (or other fluid inert to isocyanates) is pumped down the drill pipe to free the pipe and the permeable underground region from residual water which might cause the sealing composition to set-up prematurely, e.g. in the pipe. The sealing composition, a blend of the polyisocyanate compound, catalyst, and a hydrophobic solvent, is then pumped down the drill pipe and forced into the porous formation, preferably under oil pressure. This oil is introduced immediately after the sealing composition. If a packer is used, it is preferably then unseated and removed from the well. Hydrostatic pressure is maintained on the sealing composition in the porous permeable formation by the column of drilling mud; the sealing composition being kept from contacting the drilling mud by the oil which was pumped down the drill pipe. Alternatively, the packer may be left in place until after the sealing composition has gelled or hardened, the packer preventing the sealing composition from contact with the drilling mud. If a drillable retainer is used, the drill pipe is pulled out of the retainer after the sealing composition has been forced into the porous permeable formation. The treated zone is held under pressure by the automatic closing of the retainer's back pressure valve. When the drill pipe has been removed from the well, the bit is again attached to the end. The drill pipe is again lowered into the well and regular drilling operations commenced, drilling through the retainer, when used.

When pneumatic drilling is used, a somewhat similar procedure is followed. If water inflow is encountered during the drilling, a stream of high pressure natural gas is sent down the drill pipe before it is raised so as to blow out as much of the water from the well hole as possible. When the drill pipe has been removed, a packer or a drillable retainer (having a one-way valve) is substituted for the drill bit. The assembly is then lowered into the well and the packer (or retainer) is set at a point just above the porous permeable zone to be treated. The sealing composition is then pumped down the drill pipe and forced into the porous permeable formation under oil pressure. If a packer is used, the well hole above the packer may then be filled with water to maintain pressure on the sealing composition. The packer may then be removed from the well hole. In this case, the solvent of the sealing composition should be hydrophobic. This water must be blown out under gas pressure before pneumatic drilling is resumed. Alternatively, water need not be used; the packer, then, is kept in place until the sealing composition in the formation has gelled or hardened, in which case the solvent need not be hydrophobic. If a drillable retainer is used, the well hole above the retainer need not be filled with water; the treated zone being held under pressure by the automatic closing of the retainer's back pressure valve.

The polyisocyanate composition, which is used in the solutions of this invention, must contain free isocyanate (—NCO) groups in such amounts that the total weight of those groups corresponds to at least 6% of the total weight of the isocyanate composition in order to yield a solidified product having the properties such as stiffness, strength and toughness required for the purposes of this invention. Materially lower proportions of free isocyanate groups do not yield solidified products having the necessary properties. Also, the free isocyanate groups must be the sole groups which are reactible with alcoholic hydroxyl groups. The polyisocyanate composition may be composed wholly of one or more aromatic isocyanates, that is, aromatic compounds containing 2 or more free isocyanate (—NCO) groups in which the nitrogen is directly bonded to the aromatic nucleus and in which no isocyanate group has been reacted with another element or group.

Usually, the polyisocyanate composition will consist wholly or essentially of reaction products of one or more aromatic polyisocyanates with one or more aliphatic polyhydroxy compounds having a molecular weight of from about 62 to about 4000, each molecule of said reaction products containing at least 2 free isocyanate (—NCO) groups. Each polyhydroxy compound must contain at least 2 alcoholic hydroxyl groups, and may contain carboxyl

groups, the hydroxyl groups (including the —OH groups of the carboxyl groups) constituting the sole groups that are reactible with isocyanate groups. Such reaction products are much preferred over polyisocyanate compositions composed wholly of one or more (unreacted) aromatic polyisocyanates (which tend to yield solid products which are somewhat frangible) because said reaction products yield solid products having materially superior properties for the purposes of this invention. However, a minor proportion of (unreacted) aromatic polyisocyanates may be admixed with said reaction products (e.g. to increase the free isocyanate content of the polyisocyanate composition), without material deleterious effect on the properties of the solid product.

The polyisocyanate composition may be normally solid or normally liquid, i.e. at ordinary room temperatures. However, it is generally preferred to employ normally liquid polyisocyanate compositions, particularly the normally liquid polyisocyanate reaction products and normally liquid mixtures of the polyisocyanate reaction products. Such normally liquid polyisocyanate compositions yield solutions of minimum viscosity at maximum concentrations and permit more accurate control of the rate of increase in the viscosity and rate of solidification of the solutions.

Representative examples of (unreacted) aromatic polyisocyanates which can be used as the polyisocyanate compositions and in the preparation of polyisocyanate reaction products of aliphatic polyhydroxy compounds for use in the process of this invention are: toluene-2,4-diisocyanate, toluene-2,6-diisocyanate, 4-tert.-butyl-m-phenylenediisocyanate, cumene-2,4-diisocyanate, 4 - methoxy - 1,3 - phenylenediisocyanate, 4 - chloro-1,3-phenylenediisocyanate, 4-isopropyl-1,3-phenylenediisocyanate, 4-ethoxy-1,3-phenylenediisocyanate, 2,6-dimethyl-1,3-phenylenediisocyanate, 4-phenoxy-1,3-phenylenediisocyanate, 4,4′-diisocyanatodiphenyl ether, 2,4′-diisocyanatodiphenyl ether, methylene bis(4-phenylisocyanate), methylene bis(3-methyl-4-phenylisocyanate), benzidinediisocyanate, 1,5-naphthalenediisocyanate, 4,4′-diphenyldiisocyanate, toluene-2,4,6-triisocyanate, and 2,4,4′-triisocyanatodiphenylether. Mixtures of these isocyanates may be used. An isomer mixture containing 80% toluene-2,4-diisocyanate and 20% toluene-2,6-diisocyanate is preferred for preparing the polyisocyanate reaction products.

The polyisocyanate reaction products are prepared by reacting the aromatic polyisocyanate with the aliphatic polyhydroxy compound, employing the aromatic polyisocyanate in such proportion that the number of isocyanate groups is in excess of the number of reactive hydroxyl groups, usually employing about a molar excess of the aromatic polyisocyanate, so as to react all of the hydroxyl groups and leave at least two unreacted isocyanate groups in each molecule. Usually, the reaction is carried out at a temperature ranging from about 70° C. to about 120° C., but temperatures as low as room temperature may be employed in some cases. Preferably, the reaction is carried out in a dry reaction vessel protected from atmospheric moisture. When the reactants are difficultly soluble in one another, it is sometimes advantageous to add about 0.1% to about 1% by weight of an amide catalyst, such as dimethylformamide, diethylacetamide and dimethylacetamide, to facilitate the reaction. When the polyhydroxy compound is insoluble in the aromatic polyisocyanate, it is frequently difficult to obtain complete reaction at temperatures of 100° C. and below. If it is attempted to employ temperatures above 100° C. at which miscibility occurs, there is a tendency in some cases for the reaction to suddenly accelerate with the formation of undesired gel and solid resin. This has been observed in the reactions of glycerine, trimethylolpropane, trimethylolethane, and 1,2,6-hexanetriol with toluene diisocyanates. It has been found that dispersions of such polyhydroxy compounds in toluene diisocyanates can be made to react at room temperature by the addition thereto of dimethylformamide in the range of about 0.1% to about 0.3% by weight. Diethylacetamide and dimethylacetamide give the same effect but are not quite as active as dimethylformamide. Such catalyzed reaction liberates heat vigorously, and cooling should be provided. If desired, the reaction may be carried out in an inert solvent.

When the polyhydroxy compound contains free carboxyl groups, as in some polyesters, the reaction of the polyisocyanate therewith will produce carbon dioxide as a by-product which is permitted to escape or is removed by the application of heat or vacuum or both in order to avoid the formation of carbon dioxide gas in the formation. Any residual carbon dioxide in the polyisocyanate composition readily escapes when the composition is made or dissolved in a solvent in a proportion to provide a solution having a viscosity up to about 100 centipoises.

Other suitable polyisocyanate reaction products may be made from polyalkyleneether glycols such as polypropyleneether glycol, polytetramethyleneether glycol, polytetramethyleneetherformal glycol, and ethylene oxide modified polypropyleneether glycols. In order that the sealing compositions have sufficient strength and stiffness when resinified, it is preferable that the molecular weight of these polyalkyleneether glycols not exceed about 4000. When polyalkyleneether glycols having a molecular weight close to 4000 are employed to make the polyisocyanate composition (polyurethane), it is preferable to add free aromatic polyisocyanate to the reaction product to raise the free isocyanate content to about 6–8%. The following procedure illustrates the preparation of a representative example of this type of polyisocyanate sealing composition:

To 1000 parts by weight polypropyleneether glycol (M.W.=4000) is added with stirring 93.2 parts of a toluenediisocyanate isomer mixture consisting of 80% of toluene-2,4-diisocyanate and 20% of toluene-2,6-diisocyanate. External heat is applied and the mass is agitated at 110° C. for 2 hours. The free isocyanate content is 2.2%. 160 additional parts of the isomer mixture of toluenediisocyanates is introduced to raise the free isocyanate content of the polyisocyanate composition to 8.0%.

In addition to the above mentioned polyhydroxy compounds, there also may be used polyalkylenearyleneether glycols, polyalkyleneether thioether glycols, hydroxyl-terminated polyesters, hydroxyl-terminated polyaliphatic hydrocarbons, and hydroxyl-terminated polyester amides. The molecular weight of these polymeric diols should not exceed about 4000. The alkyd resins, the hydroxyl-terminated polyesters, and the hydroxyl-terminated polyester amides should have hydroxyl numbers above about 28.

Low molecular weight aliphatic polyhydroxy compounds, such as ethylene glycol, propylene glycol, trimethylene glycol, 1,4-butanediol, 1,5-pentanediol, glycerine, 1,2,6-hexanetriol, trimethylolpropane, and trimethylolethane may also be used. As pointed out heretofore, when reacting combinations such as toluenediisocyanate and glycerine which are immiscible at room temperature, it is helpful to have present about 1% by weight of dimethylformamide, or the like.

Particularly desirable polyisocyanate compositions may be prepared by the reaction of the aromatic polyisocyanates with fatty acid triglycerides, such as castor oil and blown drying oils, which have a hydroxyl number above 100, epoxidized fatty acid triglycerides, and mixtures of fatty acid triglycerides and low molecular weight alkylene polyhydric alcohols and polyalkyleneether glycols.

For example, a valuable polyisocyanate composition of this invention was prepared by adding 47.9 pounds of castor oil and 24.9 pounds of a mixture, consisting of 80% by weight of toluene-2,4-diisocyanate and 20% by weight of toluene-2,6-diisocyanate, to a thirty gallon jacketed kettle fitted with a reflux condenser, a nitrogen inlet and a stirrer. The stirrer was started and the temperature of the mixture rose to 72° C. in 21 minutes with cold water in the jacket. The mixture was heated to 100° C. and held at that temperature for about 1 hour, and then allowed to cool overnight under a nitrogen atmosphere. The product is a liquid at ordinary room temperatures, and had a free isocyanate (—NCO) content of 8.2% by weight, corresponding to the theoretical value. This product will be referred to hereinafter by the code designation "IPD–1057."

The polyalkyleneether glycols and polyalkylenearyleneether glycols are made by polymerization of cyclic ethers or condensation of the glycols. The polyalkyleneether thioether glycols are prepared in accordance with French Patent 1,128,561. Polyesters are prepared by the usual methods of condensation polymerization from polycarboxylic acids and polyhydric alcohols; the ratio of the number of available alcoholic hydroxyl groups to the number of moles of carboxyl groups available for reaction during the preparation being greater than 1.0. Such acids as adipic acid, sebacic acid, succinic acid, maleic acid or anhydrides thereof, such as succinic anhydride, are useful. Such glycols as ethylene glycol, propylene glycol, diethylene glycol, butanediol, glycerine, trimethylolpropane, pentaerythritol, and polypropyleneether glycol are suitable. Usually, the esterification is incomplete so that the polyester products will contain some unreacted carboxyl groups.

The aromatic polyisocyanates (unreacted) are well known to the art. Also, the polyisocyanate reaction products and methods for preparing them are well known in the art, represented by "German Plastics Practice" by De Bell et al. (1946), pages 300, 301, 303–305 and 310–312, Simon et al. Patents 2,577,279 and 2,602,783, Windemuth Patent 2,650,212, Langerak et al. Patents 2,692,873 and 2,692,874, French Patent 1,128,561, Publié January 8, 1957, Detrick et al. Patent 2,787,601, Barthel Patent 2,788,335, Holtschmidt Patent 2,810,711, and the application of Eric Barthel, Jr., filed September 30, 1953, as Serial No. 383,370 and now Patent No. 2,833,730.

Usually, the sealing composition must be pumped to the porous underground formation, as in the case of oil wells and the like. Also, in order to provide effective and long-lasting sealing, it is necessary that a sealing composition penetrate the pores of the underground formation to a considerable extent. For these reasons, including particularly the nature of the pumps employed in the oil well industry, it is essential that the sealing composition be in the form of a liquid having a Brookfield viscosity not greater than about 100 centipoises (cps.) at 25° C. at the time that it reaches and is forced into the porus underground formation. Some aromatic polyisocyanates, such as toluene-2,4-diisocyanate, toluene-2,6-diisocyanate, 4-tert.-butyl-m-phenylenediisocyanate and cumene-2,4-diisocyanate, normally are liquids having sufficiently low viscosities such that they can be used without a solvent, but their use as such is too costly for practical purposes at the present time. Most isocyanate compositions of this invention normally are too viscous for use without a solvent, and some are solids.

Therefore, the sealing compositions of this invention are solutions of the polyisocyanate compositions in an inert organic solvent, which solutions will have a Brookfield viscosity of up to 100 cps. at 25° C. at the time that the solution is applied to and is forced into the porous underground formation. In order that the sealant (the solidified or gelled mass formed in the underground formation) will have the desired toughness and stiffness and will completely fill the pores of the formation, the polyisocyanate composition must constitute at least about 40% by weight of the solution. Since increasing concentrations of the polyisocyanate composition in the solution usually result in increase in the viscosity of the solution, the maximum concentration of the polyisocyanate composition will be limited by the maximum permissible viscosity of the solution which, in turn, is dependent upon the temperature at which the solution is to be pumped, or otherwise applied, to the underground formation. For any particular concentration of polyisocyanate composition, the viscosity of the solution will be dependent upon the particular polyisocyanate composition, the particular solvent, and the temperature of the solution. Usually, the polyisocyanate composition will be in a concentration of from about 40% to about 60% by weight, preferably from about 40% to about 50%.

The solvent portion of the sealing composition is an organic liquid or mixture of two or more organic liquids which must be inert, i.e. unreactive to the polyisocyanate composition and to the catalyst, and must be a solvent for both the isocyanate composition and the catalyst. Also, the solvent should have a flash point of at least 40° C. in an open cup at atmospheric pressure, which will be understood to include those solvents which have no flash point, i.e. which do not flash at any temperature. Solvents (e.g. acetone), having flash points significantly below 40° C., present serious fire hazards and hence are undesirable. The solvents having such flash points do not boil at the temperature and the high pressures prevailing in the underground formations, i.e. the pressures encountered in such formations are sufficiently high to prevent boiling of such solvents. Boiling of the solvent in the underground formation during the gelling and solidifying of the sealing composition tends to render the sealant inefficient or ineffective by rendering the sealant porous and hence providing passages for water or gas through the sealant and the formation.

Preferably, the solvent will be hydrophobic, that is, it will be immiscible with water and will not dissolve water. Water reacts with the polyisocyanate to yield carbon dioxide which tends to render the sealant porous and inefficient or ineffective. Therefore, when the underground formation contains water or there is a possibility that the sealing composition otherwise will come into contact with water, it is essential that the solvent be hydrophobic, whereby water will have difficulty in penetrating the sealing solution and the polyisocyanate composition in the solution will be protected against intimate contact with any significant amount of water. On the other hand, if the porous underground formation to be sealed is dry, i.e. does not contain water and has not been contacted with water (as by the use of water-containing drilling fluids), it is not necessary that the solvent of the sealing composition be hydrophobic, but it must be anhydrous.

Liquid halogenated hydrocarbons, having the required flash points, constitute a preferred class of solvents, particularly the polyhalogenated lower aliphatic hydrocarbons, i.e. those containing 2 to 5 carbon atoms. Representative suitable members of this class are trichloroethylene, dichloropentanes, particularly mixtures of the isomeric dichloropentanes, tetrachloroethylenes, trichloropropanes, e.g. 1,2,3-trichloropropane, dichlorobutanes, e.g. 2,3-dichlorobutane, pentachloroethane, 1,1,2,3,3,3-hexachloro-1,2-difluoropropane and its isomers, dibromopropanes, e.g., 1,3-dibromopropane, liquid dichlorobenzenes, e.g. o-dichlorobenzene and m-dichlorobenzene, and bromobenzene. Trichloroethylene is most preferred. Other solvents which may be used include isoamyl acetate, cyclohexyl acetate, diamyl phthalate, methyl butyl ketone, cyclohexanone, and the like, The catalyst of the sealing composition is a phenol of the formula

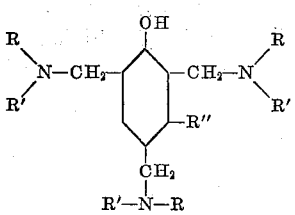

wherein R and R' represent at least one member of the group consisting of separate open-chain alkyl radicals of 1-8 carbon atoms and alkylene radicals of 4-5 carbon atoms which jointly with the nitrogen atom form a heterocyclic ring, the sum of the R and R' radicals containing a total of 6 to 24 carbon atoms, and R'' represents a member of the group consisting of hydrogen and a methyl radical. When R and R' represent only separate open-chain alkyl radicals (i.e. each R and each R' represents such a radical), each

radical is a dialkylamino radical and the catalyst conventionally is a 2,4,6-tris(dialkylaminomethyl)phenol, and such class of catalysts is preferred, particularly where each alkyl radical contains 1-4 carbon atoms. When R and R' (i.e. the R and the R' attached to the same nitrogen atom) represent an alkylene radical of 4-5 carbon atoms which jointly with the nitrogen atom form a heterocyclic ring, the

radical is a 1-pyrrolidinyl radical having the formula

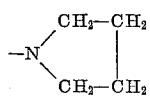

or a piperidino radical having the formula

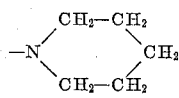

All of the

groups may be pyrrolidinyl or piperidino radicals, or 1 or 2 thereof may be such radicals and the rest dialkylamino radicals. In any event, the sum of the carbon atoms in the R and R' radicals (the six radicals represented by R and R') should not exceed a total of 24 carbon atoms. The activity of the catalyst on a weight basis decreases as the total number of carbon atoms in the radicals represented by R and R' increases.

Representative examples of these catalysts are 2,4,6-tris(dimethylaminomethyl)phenol, 2,4,6 - tris(dimethylaminomethyl)-3-methyl phenol, 2,4,6-tris(diethylaminomethyl)phenol, 2,4,6-tris(diethylaminomethyl)-3-methyl phenol, 2,4,6-tris(dipropylaminomethyl)phenol, 2,4,6-tris(dipropylaminomethyl) - 3 - methyl phenol, 2,4,6-tris(dibutylaminomethyl)phenol, 2,4,6-tris(dibutylaminomethyl)3-methyl phenol, 2-dioctylaminomethyl - 4,6-bis-(dimethylaminomethyl)phenol, 2,4,6 - tris(piperidinomethyl)phenol, and 2,4,6 - tris(1-pyrrolidinylmethyl)-phenol. 2,4,6-tris(dimethylaminomethyl)phenol is most preferred.

The phenols, which constitute the catalyst of this invention, are in general well-known compounds and methods for making them are also well-known. They are made conveniently by the reaction of phenol or m-cresol with at least three mol equivalents each of formaldehyde and of the appropriate secondary amine by methods such as those disclosed by Bruson and Mac-Mullin in Patent No. 2,220,834, dated November 5, 1940, and in J. Am. Chem. Soc., 63, pages 270–272 (1941).

These catalysts may be dissolved in the solvent at the same time as the polyisocyanate composition and in certain cases, as when the effect of the catalyst is sufficiently slow, prior to dissolving the polyisocyanate composition in the solvent. However, it is much preferred to add the catalyst to the solution of the polyisocyanate composition. The polyisocyanate compositions and their solutions in the inert solvents are quite stable in the absence of water, catalyst or chain extenders, and can be prepared considerably in advance and stored until needed. However, after the catalyst is added, the viscosity of the solution gradually rises and, eventually, the polyisocyanate composition is converted into an infusible resin and the solution is converted into a solid gel or mass. Therefore, the sealing composition, i.e. the solution containing both the polyisocyanate composition and the catalyst, must be freshly prepared before use.

The sealing composition must be conveyed to the porous formation and forced into the formation before its viscosity rises above about 100 cps. This usually requires from about 30 minutes to about 2 hours, particularly in the case of oil wells where the drill pipe through which it is introduced (pumped) may be a mile or more long. This time will be sometimes referred to hereinafter as "pumping time." Therefore, the sealing composition must have an initial viscosity (when first prepared) below 100 cps. at 25° C., usually 75 cps. or below and preferably about 10 to about 40 cps., and a catalyst concentration, coordinated with the initial viscosity, so as to provide the necessary pumping time of at least 30 minutes, preferably from about 1–2 hours.

Furthermore, the time required for the sealing compositions of this invention to harden (i.e. to become converted to a tough gel or a solid mass and seal the porous formation) can be predicted with a high degree of accuracy, within a few minutes in the laboratory and within 30 minutes in the field, whereby the user can determine the length of time that he must maintain the composition under pressure in the formation. This constitutes a particular advantage of this invention. Such hardening time can be varied from about 20 minutes to about 24 hours after the sealing composition has been introduced into the porous formation, by adjusting the proportions of the ingredients in the sealing composition in accord with the temperature of the underground formation to be treated. Usually, it is desired that the sealing composition harden as rapidly as possible after it has been forced into the porous formation so as to delay the resumption of the operation, e.g. drilling, as little as possible. For this purpose, the hardening time can be readily controlled to be within the range of from about 20 minutes to about 4 hours, depending upon the temperature of the formation and the desired margin of safety against premature gelation, and still provide the required pumping time. In other cases, the longer hardening times will be desired, as when the porous formation is more extensive or thicker and it is desired to obtain deeper penetration of the sealing composition into the porous formation, when the formation is of low permeability so as to require more time to obtain the desired penetration, or a large margin of safety against premature gelation is desired for other reasons. Such longer hardening times can be readily obtained by this invention, by employing the lower proportions of polyisocyanate composition and catalyst and the use of the less active catalyst.

The amount of the catalyst employed will depend upon the activity of the particular catalyst, the initial viscosity of the sealing composition, the temperature of the sealing composition, and the temperature of the porous formation. The time for hardening of the sealing composition decreases with increase in the temperature of the porous formation, being very rapid at a formation temperature of 120° C. The catalysts of this invention are employed in a proportion in the range of from about 0.32 part to 0.32+(90-T) (0.0372) parts by weight for each 100 parts by weight of the polyisocyanate composition. In other words, the maximum proportion of the catalyst is calculated by subtracting the temperature of the formation in ° C. from 90, multiplying the resulting figure by 0.0372 and adding that figure to 0.32. Thus, if the temperature of the porous formation is 50° C., the formula becomes 0.32+(90-50) (0.0372) and the maximum amount of catalyst is 1.808 parts per 100 parts of isocyanate composition. At temperatures T of from about 15° C. to about 90° C., the maximum amount of the catalyst will be in the range of from about 0.32% to about 3.1% by weight based on the weight of the polyisocyanate composition. Ordinarily, the catalyst will be employed in a proportion of about 1% by weight of the polyisocyanate composition. By regulating the proportion of the catalyst within the range above set forth, particularly with concomitant regulation of the concentration of the polyisocyanate composition (i.e. the initial viscosity of the solution), the pumping time can be readily controlled to provide that required by the operation involved while at the same time providing the minimum hardening time in the porous formation.

The pumping time and the hardening time for any particular sealing composition can be readily determined by measuring the time required for the viscosity of the composition to rise above 100 cps. (pumping time) from the time of its preparation and the time required for its viscosity to rise above 100,000 cps. from the time that the sealing composition was first prepared (total hardening time), i.e. at which it is converted to a stiff gel or solid mass, which may vary from about 1 to about 24 hours. The net hardening time in the porous formation is the difference between the total hardening time and the actual pumping time, i.e. the time actually required to convey the sealing composition to and force it into the porous formation. The determination of the pumping time and the total and net hardening times for each sealing composition can be readily determined in the laboratory by any competent technician.

In order to more clearly illustrate this invention and a preferred mode of practicing it, the following examples are given in which the parts and proportions are by weight except where otherwise specifically indicated.

EXAMPLE 1

A. *Preparation of the polyisocyanate composition*

To a mixture, consisting of 41.9 parts by weight of castor oil and 7.4 parts by weight of polyethyleneether glycol (M.W.=200), was added with stirring 50.7 parts of a toluenediisocyanate isomer mixture (80% toluene-2,4-diisocyanate and 20% toluene-2,6-diisocyanate). An exothermic reaction took place. External cooling was applied to keep the temperature of the mass from exceeding 120° C. When the heat evolution slackened, external heat was applied to maintain the temperature. The mass was agitated at 120° C. for 2 hours. The product was cooled to about 40° C. It had a free isocyanate content of about 15.3% and a Brookfield viscosity at 30° C. of about 10,000 cps.

B. *Occurrence of drilling difficulty*

An oil well was drilled by the conventional rotary hydraulic (mud) method to a depth of about 7400 feet when it became necessary to stop. A flow of sulfur water from the formation below 7370 feet could not be kept under control by increasing the drilling mud density. If the mud density were increased further the added weight of the mud column would cause loss of drilling fluid at 5800 feet. The sulfur water was attacking the alkaline mud and ruining it for further drilling service.

C. *Preparation of the oil well sealing composition*

One hundred gallons of the polyisocyanate composition prepared in part A was added to 100 gallons of trichloroethylene in a ribbon blender and mixed for 15 minutes. The solution then contained the polyisocyanate composition in a concentration of 40% by weight and had an initial viscosity of about 10 cps. at 25° C. Just before this solution was pumped down the drill pipe, one gallon of 2,4,6-tris(dimethylaminomethyl)phenol was introduced, corresponding to 1 part by weight of the phenol per 100 parts of the polyisocyanate composition in the solution. The composition obtained would set to a hard resin in 4 hours at 50° C.

D. *Sealing the porous formation*

The drill pipe was raised 150 feet, the packer (located above the bit) was expanded against the well wall, and the mud return flow valve of the packer closed. Fifteen barrels of dry diesel oil was pumped down the drill pipe to displace the drilling mud and to drive out water left by the mud. Then 4 barrels of the sealing composition prepared in part C above was pumped down the drill pipe. Ten barrels of dry diesel oil followed. Finally, drilling mud was introduced into the drill pipe. The sealing composition in the porous formation was maintained at a temperature of about 50° C. and under a pressure of 250 lbs./sq. in. above the formation pressure for 8 hours to insure that the composition had thoroughly hardened. Then the packer was contracted and the pressure released, the drill pipe and bit were positioned in the well as before, and drilling was resumed, using low density mud. No further water flow occurred from the porous formation into which the sealing composition was injected.

EXAMPLE 2

The polyisocyanate composition of part A of Example 1 was dissolved in trichloroethylene in various concentrations in the absence of any catalyst and the viscosities at various temperatures determined with the results shown in Table I:

TABLE I

*Viscosity of trichloroethylene solutions containing no catalyst*

| Temp., ° C. | 41.6% Conc. | 50% Conc. | 70% Conc. |
| --- | --- | --- | --- |
| | Cps. | Cps. | Cps. |
| 26.7 | 10 | 40 | 200 |
| 15.6 | 15 | 50 | 340 |
| 4.4 | 30 | 80 | 610 |
| 0.0 | 40 | 90 | 860 |
| -6.7 | 60 | 120 | 1,300 |

It is apparent that 70% by weight or more of this polyisocyanate composition in this solvent provides solutions that are too viscous for field use.

Solutions, containing 41.6% and 50% by weight of the same polyisocyanate composition in trichloroethylene, were prepared and blended with various amounts of 2,4,6-tris(dimethylaminomethyl)phenol (percent by weight based on the weight of the polyisocyanate composition) and held at 25° C. The viscosities were determined after various periods of time ($t$) measured from the time that the catalyst was added. The results are shown in Table II:

TABLE II

*Increase in viscosity of trichloroethylene solutions after the catalyst has been added*

| Polyisocyanate | 41.6% Conc. | 50% Conc. | 50% Conc. |
|---|---|---|---|
| Catalyst Added (Percent) | 5 | 1 | 3 |
| | Cps. | Cps. | Cps. |
| at t=0 | 12 | 40 | 40 |
| t=20 min | 50 | 50 | 80 |
| t=40 min | 100,000+ | 65 | 1,010 |
| t=60 min | | 80 | 100,000+ |
| t=120 min | | 120 | |
| t=780 min | | 100,000+ | |

It will be apparent that as much as 5% catalyst in the 41.6% solution provides somewhat more than 20 minutes pumping time and a total hardening time of about 40 minutes, and 3% catalyst in the 50% solution provides little more than 20 minutes pumping time, whereas 1% catalyst in even the 50% solution provides more than 60 minutes (1 hour) pumping time.

Solutions, containing various concentrations of the same polyisocyanate composition and 1% by weight of 2,4,6-tris(dimethylaminomethyl)phenol based on the weight of the polyisocyanate composition in trichloroethylene, were held at various temperatures and the time determined for those solutions to gel, i.e. attain a viscosity above 100,000 cps. The results are shown in Table III:

TABLE III

*Time needed to reach 100,000+ centipoise viscosity*

| T (°C.) | Time (min.) | | |
|---|---|---|---|
| | 41.6% Conc. | 45.4% Conc. | 50% Conc. |
| 25 | 640 | 480 | 320 |
| 30 | 535 | 415 | 270 |
| 35 | 460 | 360 | 235 |
| 40 | 380 | 310 | 205 |
| 50 | 260 | 215 | 150 |
| 60 | 165 | 140 | 98 |
| 70 | 88 | 70 | 60 |

It was further found that the solutions of Table III reached a viscosity above 100,000 cps. in only 20-25 minutes at 120° C. While the 50% solution of the polyisocyanate composition containing 1% catalyst provides a pumping time of 1 hour, the 41.6% solution containing 1% of catalyst has a much greater margin of safety against premature gelation and yet hardens in desirably short times at formation temperatures at 50° C. and above.

EXAMPLE 3

A 50% solution of "IPD-1057" (prepared from castor oil and a mixture of toluenediisocyanates as described hereinbefore) in trichloroethylene has a viscosity of about 57 cps. at 25° C. When 2,4,6-tris(dimethylaminomethyl)phenol was added to samples of such solution in proportions of 1% and 3.15% by weight based on the weight of the polyisocyanate composition and the samples were held at room temperature, the sample containing 1% catalyst gelled in a little over 1320 minutes (22+ hours) and that containing 3.15% catalyst gelled in 300 minutes.

It will be understood that the proceding examples are given for illustrative purposes solely and that this invention is not limited to the specific embodiments described therein. On the other hand, it will be apparent to those skilled in the art that many variations and modifications can be made therein, particularly in the ingredients and proportions of ingredients of the sealing compositions and in the techniques employed, as indicated in the general description without departing from the spirit or scope of this invention.

From the preceding description, it will be apparent that this invention provides a new process for effectively and efficiently sealing porous underground formations which is simple and easy to operate and control. Particularly, it provides such a process employing a novel class of sealing compositions which are of a character such that both the pumping time and the hardening time can be controlled as desired with a high degree of predictability. Therefore, it is obvious that this invention constitutes a valuable advance in and contribution to the art.

What I claim is:

1. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) at least about 40% by weight of a polyisocyanate composition containing at least 6% by weight of free isocyanate groups as the sole groups reactible with alcoholic hydroxyl groups, said polyisocyanate composition consisting of at least one member of the class consisting of aromatic polyisocyanates and reaction products of an aromatic polyisocyanate with an aliphatic polyhydroxy compound having a molecular weight of from about 62 to about 4000 and containing at least 2 alcoholic hydroxyl groups and in which the sole groups reactible with isocyanate groups are hydroxyl groups, each molecule of said reaction products containing at least 2 free isocyanate groups; (2) for each 100 parts of said polyisocyanate composition from about 0.32 part to 0.32+(90.0−T) (0.0372) parts by weight of a phenol of the formula.

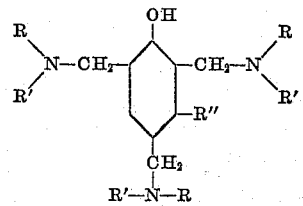

wherein R and R' represent at least one member of the group consisting of separate open-chain alkyl radicals of 1–8 carbon atoms and alkylene radicals of 4–5 carbon atoms which jointly with the nitrogen atom form a heterocyclic ring, the sum of the R and R' radicals containing a total of 6 to 24 carbon atoms, and R" represents a member of the group consisting of hydrogen and a methyl radical, the amount of said phenol being insufficient to cause the viscosity of the solution to rise above 100 cps. at 25° C. in 30 minutes; and (3) an inert liquid organic solvent having a flash point of at least 40° C. in an open cup at atmospheric pressure and which is a solvent for both the polyisocyanate composition and the phenol; and maintaining the solution in the pores of the formation until it has solidified.

2. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) at least about 40% by weight of a polyisocyanate composition containing at least 6% by weight of free isocyanate groups as the sole groups reactible with alcoholic hydroxyl groups, said polyisocyanate composition consisting of at least one member of the class consisting of aromatic polyisocyanates and reaction products of an aromatic polyisocyanate with an aliphatic polyhydroxy compound having a molecular weight of from about 62 to about 4000 and containing at least 2 alcoholic hydroxyl groups and in which the sole groups reactible with isocyanate groups are hydroxyl groups, each molecule of said reaction products containing at least 2 free isocyanate groups; (2) for each 100 parts of said polyisocyanate composition from about 0.32 part to $0.32 + (90.0-T)(0.0372)$ parts by weight of a phenol of the formula

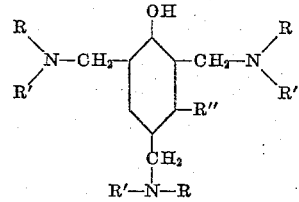

wherein R and R' represent at least one member of the group consisting of separate open-chain alkyl radicals of 1–8 carbon atoms and alkylene radicals of 4–5 carbon atoms which jointly with the nitrogen atom form a heterocyclic ring, the sum of the R and R' radicals containing a total of 6 to 24 carbon atoms, and R'' represents a member of the group consisting of hydrogen and a methyl radical, the amount of said phenol being insufficient to cause the viscosity of the solution to rise above 100 cps. at 25° C. in 30 minutes; and (3) an inert liquid hydrophobic organic solvent having a flash point of at least 40° C. in an open cup at atmospheric pressure and which is a solvent for both the polyisocyanate composition and the phenol; and maintaining the solution in the pores of the formation until it has solidified.

3. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) at least about 40% by weight of a normally liquid polyisocyanate composition containing at least 6% by weight of free isocyanate groups as the sole groups reactible with alcoholic hydroxyl groups, said polyisocyanate composition consisting essentially of reaction products of an aromatic polyisocyanate with an aliphatic polyhydroxy compound having a molecular weight of from about 62 to about 4000 and containing at least 2 alcoholic hydroxyl groups and in which the sole groups reactible with isocyanate groups are hydroxyl groups, each molecule of said reaction products containing at least 2 free isocyanate groups; (2) for each 100 parts of said polyisocyanate composition from about 0.32 part to $0.32 + (90.0-T)(0.0372)$ parts by weight of a phenol of the formula

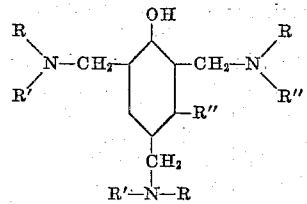

wherein R and R' represent at least one member of the group sonsisting of separate open-chain alkyl radicals of 1–8 carbon atoms and alkylene radicals of 4–5 carbon atoms which jointly with the nitrogen atom form a heterocyclic ring, the sum of the R and R' radicals containing a total of 6 to 24 carbon atoms, and R'' represents a member of the group consisting of hydrogen and a methyl radical, the amount of said phenol being insufficient to cause the viscosity of the solution to rise above 100 cps. at 25° C. in 30 minutes; and (3) an inert liquid hydrophobic organic solvent having a flash point of at least 40° C. in an open cup at atmospheric pressure and which is a solvent for both the polyisocyanate composition and the phenol; and maintaining the solution in the pores of the formation until it has solidified.

4. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) at least about 40% by weight of a normally liquid polyisocyanate composition containing at least 6% by weight of free isocyanate groups as the sole groups reactible with alcoholic hydroxyl groups, said polyisocyanate composition consisting of reaction products of an aromatic polyisocyanate with an aliphatic polyhydroxy compound having a molecular weight of from about 62 to about 4000 and containing at least 2 alcoholic hydroxyl groups and in which the sole groups reactible with isocyanate groups are hydroxyl groups, each molecule of said reaction products containing at least 2 free isocyanate groups, and a minor proportion of an unreacted aromatic polyisocyanate; (2) for each 100 parts of said polyisocyanate composition from about 0.32 part to $0.32 + (90.0-T)(0.0372)$ parts by weight of a phenol of the formula

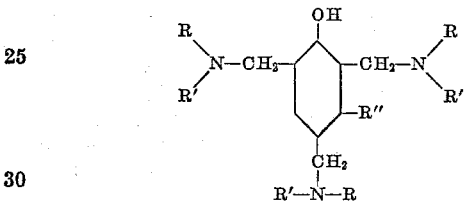

wherein R and R' represent at least one member of the group consisting of separate open-chain alkyl radicals of 1–8 carbon atoms and alkylene radicals of 4–5 carbon atoms which jointly with the nitrogen atom form a heterocyclic ring, the sum of the R and R' radicals containing a total of 6 to 24 carbon atoms, and R'' represents a member of the group consisting of hydrogen and a methyl radical, the amount of said phenol being insufficient to cause the viscosity of the solution to rise above 100 cps. at 25° C. in 30 minutes; and (3) an inert liquid hydrophobic organic solvent having a flash point of at least 40° C. in an open cup at atmospheric pressure and which is a solvent for both the polyisocyanate composition and the phenol; and maintaining the solution in the pores of the formation until it has solidified.

5. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) about 40% to about 50% by weight of a polyisocyanate composition containing at least 6% by weight of free isocyanate groups as the sole groups reactible with alcoholic hydroxyl groups, said polyisocyanate composition consisting essentially of the reaction product of a molar excess of an arylene diisocyanate with a polyhydroxy fatty acid triglyceride having a hydroxyl number above 100, each molecule of said reaction product containing at least 2 free isocyanate groups; (2) for each 100 parts of said polyisocyanate composition from about 0.32 part to $0.32 + (90.0-T)(0.0372)$ parts by weight of a phenol of the formula

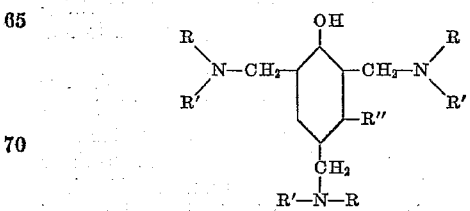

wherein R and R' represent at least one member of the group consisting of separate open-chain alkyl radicals of 1–8 carbon atoms and alkylene radicals of 4–5 carbon atoms which jointly with the nitrogen atom form a heterocyclic ring, the sum of the R and R' radicals containing a total of 6 to 24 carbon atoms, and R" represents a member of the group consisting of hydrogen and a methyl radical, the amount of said phenol being insufficient to cause the viscosity of the solution to rise above 100 cps. at 25° C. in 30 minutes; and (3) an inert liquid organic solvent having a flash point of at least 40° C. in an open cup at atmospheric pressure and which is a solvent for both the polyisocyanate composition and the phenol; and maintaining the solution in the pores of the formation until it has solidified.

6. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) about 40% to about 50% by weight of a polyisocyanate composition containing at least 6% by weight of free isocyanate groups as the sole groups reactible with alcoholic hydroxyl groups, said polyisocyanate composition consisting essentially of the reaction product of about 50.7 parts by weight of a mixture of toluene-2,4-diisocyanate and toluene-2,6-diisocyanate with a mixture of about 41.9 parts by weight of castor oil and about 7.4 parts by weight of a polyethyleneether glycol having a molecular weight of about 200; (2) for each 100 parts of said polyisocyanate composition from about 0.32 part to $0.32+(90.0-T)(0.0372)$ parts by weight of a phenol of the formula

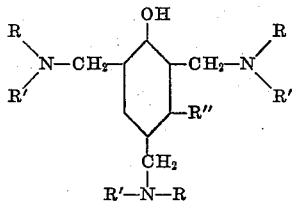

wherein R and R' represent at least one member of the group consisting of separate open-chain alkyl radicals of 1–8 carbon atoms and alkylene radicals of 4–5 carbon atoms which jointly with the nitrogen atom form a heterocyclic ring, the sum of the R and R' radicals containing a total of 6 to 24 carbon atoms, and R" represents a member of the group consisting of hydrogen and a methyl radical, the amount of said phenol being insufficient to cause the viscosity of the solution to rise above 100 cps. at 25° C. in 30 minutes; and (3) an inert liquid organic solvent having a flash point of at least 40° C. in an open cup at atmospheric pressure and which is a solvent for both the polyisocyanate composition and the phenol; and maintaining the solution in the pores of the formation until it has solidified.

7. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) at least about 40% by weight of a polyisocyanate composition containing at least 6% by weight of free isocyanate groups as the sole groups reactible with alcoholic hydroxyl groups, said polyisocyanate composition consisting of at least one member of the class consisting of aromatic polyisocyanates and reaction products of an aromatic polyisocyanate with an aliphatic polyhydroxy compound having a molecular weight of from about 62 to about 4000 and containing at least 2 alcoholic hydroxyl groups and in which the sole groups reactible with isocyanate groups are hydroxyl groups, each molecule of said reaction products containing at least 2 free isocyanate groups; (2) for each 100 parts of said polyisocyanate composition from about 0.32 part to $0.32+(90.0-T)(0.0372)$ parts by weight of a 2,4,6-tris(dialkylaminomethyl)phenol in which each alkyl radical contains 1–8 carbon atoms and the sum of said alkyl radicals contains 6–24 carbon atoms, the amount of said phenol being insufficient to cause the viscosity of the solution to rise above 100 cps. at 25° C. in 30 minutes; and (3) an inert liquid organic solvent having a flash point of at least 40° C. in an open cup at atmospheric pressure and which is a solvent for both the polyisocyanate composition and the phenol; and maintaining the solution in the pores of the formation until it has solidified.

8. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) at least about 40% by weight of a polyisocyanate composition containing at least 6% by weight of free isocyanate groups as the sole groups reactible with alcoholic hydroxyl groups, said polyisocyanate composition consisting of at least one member of the class consisting of aromatic polyisocyanates and reaction products of an aromatic polyisocyanate with an aliphatic polyhydroxy compound having a molecular weight of from about 62 to about 4000 and containing at least 2 alcoholic hydroxyl groups and in which the sole groups reactible with isocyanate groups are hydroxyl groups, each molecule of said reaction products containing at least 2 free isocyanate groups; (2) for each 100 parts of said polyisocyanate composition from about 0.32 part to $0.32+(90.0-T)(0.0372)$ parts by weight of a 2,4,6-tris(dialkylaminomethyl)phenol in which each alkyl group contains 1–4 carbon atoms, the amount of said phenol being insufficient to cause the viscosity of the solution to rise above 100 cps. at 25° C. in 30 minutes; and (3) an inert liquid hydrophobic organic solvent having a flash point of at least 40° C. in an open cup at atmospheric pressure and which is a solvent for both the polyisocyanate composition and the phenol; and maintaining the solution in the pores of the formation until it has solidified.

9. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) at least about 40% by weight of a normally liquid polyisocyanate composition containing at least 6% by weight of free isocyanate groups as the sole groups reactible with alcoholic hydroxyl groups, said polyisocyanate composition consisting essentially of reaction products of an aromatic polyisocyanate with an aliphatic polyhydroxy compound having a molecular weight of from about 62 to about 4000 and containing at least 2 alcoholic hydroxyl groups and in which the sole groups reactible with isocyanate groups are hydroxyl groups, each molecule of said reaction products containing at least 2 free isocyanate groups; (2) for each 100 parts of said polyisocyanate composition from about 0.32 part to $0.32+(90.0-T)(0.0372)$ parts by weight of a 2,4,6-tris(dialkylaminomethyl)phenol in which each alkyl group contains 1–4 carbon atoms, the amount of said phenol being insufficient to cause the viscosity of the solution to rise above 100 cps. at 25° C. in 30 minutes; and (3) an inert liquid hydrophobic organic solvent having a flash point of at least 40° C. in an open cup at atmospheric pressure and which is a solvent for both the polyisocyanate composition and the phenol; and maintaining the solution in the pores of the formation until it has solidified.

10. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) about 40% to about 50% by weight of a normally liquid polyisocyanate composition containing at least 6% by weight of free isocyanate groups as the sole groups reactible with alcoholic hydroxy groups, said polyisocyanate composition consisting essentially of the reaction product of a molar excess of an arylene diisocyanate with a polyhydroxy fatty acid triglyceride having a hydroxyl number above 100, each molecule of said reaction product containing at least 2 free isocyanate groups; (2) for each 100 parts of said polyisocyanate composition from about 0.32 part to $0.32+(90.0-T)$ $(0.0372)$ parts by weight of a 2,4,6-tris (dialkylaminomethyl)phenol in which each alkyl group contains 1–4 carbon atoms, the amount of said phenol being insufficient to cause the viscosity of the solution to rise above 100 cps. at 25° C. in 30 minutes; and (3) a ninert liquid hydrophobic organic solvent having a flash point of at least 40° C. in an open cup at atmospheric pressure and which is a solvent for both the polyisocyanate composition and the phenol; and maintaining the solution in the pores of the formation until it has solidified.

11. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) at least about 40% by weight of a polyisocyanate composition containing at least 6% by weight of free isocyanate groups as the sole groups reactible with alcoholic hydroxyl groups, said polyisocyanate composition consisting of at least one member of the class consisting of aromatic polyisocyanates and reaction products of an aromatic polyisocyanate with an aliphatic polyhydroxy compound having a molecular weight of from about 62 to about 4000 and containing at least 2 alcoholic hydroxyl groups and in which the sole groups reactible with isocyanate groups or hydroxyl groups, each molecule of said reaction products containing at least 2 free isocyanate groups; (2) for each 100 parts of said polyisocyanate composition from about 0.32 part to $0.32+(90.0-T)$ $(0.0372)$ parts by weight of 2,4,6-tris-dimethylaminomethyl)phenol, the amount of said phenol being insufficient to cause the viscosity of the solution to rise above 100 cps. at 25° C. in 30 minutes; and (3) an inert liquid hydrophobic organic solvent having a flash point of at least 40° C. in an open cup at atmospheric pressure and which is a solvent for both the polyisocyanate composition and the phenol; and maintaining the solution in the pores of the formation until it has solidified.

12. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) at least about 40% by weight of a normally liquid polyisocyanate composition containing at least 6% by weight of free isocyanate groups as the sole groups reactible with alcoholic hydroxyl groups, said polyisocyanate composition consisting essentially of reaction products of an aromatic polyisocyanate with an aliphatic polyhydroxy compound having a molecular weight of from about 62 to about 4000 and containing at least 2 alcoholic hydroxy groups and in which the sole groups reactible with isocyanate groups are hydroxyl groups, each molecule of said reaction products containing at least 2 free isocyanate groups; (2) for each 100 parts of said polyisocyanate composition from about 0.32 part to $0.32+(90.0-T)$ $(0.0372)$ parts by weight of 2,4,6-tris(dimethylaminomethyl)phenol, the amount of said phenol being insufficient to cause the viscosity of the solution to rise above 100 cps. at 25° C. in 30 minutes; and (3) an inert liquid hydrophobic organic solvent having a flash point of at least 40° C. in an open cup at atmospheric pressure and which is a solvent for both the polyisocyanate composition and the phenol; and maintaining the solution in the pores of the formation until it has solidified.

13. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) about 40% to about 50% by weight of a polyisocyanate composition containing at least 6% by weight of free isocyanate groups as the sole groups reactible with alcoholic hydroxy groups, said polyisocyanate composition consisting essentially of the reaction product of a molar excess of an arylene diisocyanate with a polyhydroxy fatty acid triglyceride having a hydroxyl number above 100, each molecule of said reaction product containing at least 2 free isocyanate groups; (2) for each 100 parts of said polyisocyanate composition from about 0.32 part to $0.32+(90.0-T)$ $(0.0372)$ parts by weight of 2,4,6-tris(dimethylaminomethyl)phenol, the amount of said phenol being insufficient to cause the viscosity of the solution to rise above 100 cps. at 25° C. in 30 minutes; and (3) an inert liquid organic solvent having a flash point of at least 40° C. in an open cup at atmospheric pressure and which is a solvent for both the polyisocyanate composition and the phenol; and maintaining the solution in the pores of the formation until it has solidified.

14. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) about 40% to about 50% by weight of a polyisocyanate composition containing at least 6% by weight of free isocyanate groups as the sole groups reactible with alcoholic hydroxyl groups, said polyisocyanate composition consisting essentially of the reaction product of about 50.7 parts by weight of a mixture of toluene-2,4-diisocyanate and toluene-2,6-diisocyanate with a mixture of about 41.9 parts by weight of castor oil and about 7.4 parts by weight of a polyethyleneether glycol having a molecular weight of about 200; (2) for each 100 parts of said polyisocyanate composition from about 0.32 part to $0.32+(90.0-T)(0.0372)$ parts by weight of 2,4,6-tris(dimethylaminomethyl)phenol, the amount of said phenol being insufficient to cause the viscosity of the solution to rise above 100 cps. at 25° C. in 30 minutes; and (3) an inert liquid hydrophobic organic solvent having a flash point of at least 40° C. in an open cup at atmospheric pressure and which is a solvent for both the polyisocyanate composition and the phenol; and maintaining the solution in the pores of the formation until it has solidified.

15. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) at least about 40% by weight of a polyisocyanate composition containing at least 6% by weight of free isocyanate groups as the sole groups reactible with alcoholic hydroxyl groups, said polyisocyanate composition consisting of at least one member of the class consisting of aromatic polyisocyanates and reaction products of an aromatic polyisocyanate with an aliphatic polyhydroxy compound having a molecular weight of from about 62 to about 4000 and containing at least 2 alcoholic hydroxyl groups and in which the sole groups reactible with isocyanate groups are hydroxyl groups, each molecule of said reaction products containing at least 2 free isocyanate groups; (2) for each 100 parts of said polyisocyanate composition from about 0.32 part to 0.32+(90.0−T)(0.0372) parts by weight of a phenol of the formula

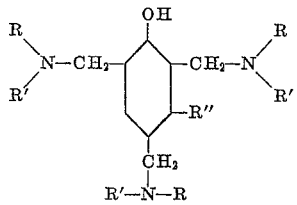

wherein R and R′ represent at least one member of the group consisting of separate open-chain alkyl radicals of 1–8 carbon atoms and alkylene radicals of 4–5 carbon atoms which jointly with the nitrogen atom form a heterocyclic ring, the sum of the R and R′ radicals containing a total of 6 to 24 carbon atoms, and R″ represents a member of the group consisting of hydrogen and a methyl radical, the amount of said phenol being insufficient to cause the viscosity of the solution to rise above 100 cps. at 25° C. in 30 minutes; and (3) a liquid halogenated hydrocarbon solvent having a flash point of at least 40° C. in an open cup at atmospheric pressure and which is a solvent for both the polyisocyanate composition and the phenol, and maintaining the solution in the pores of the formation until it has solidified.

16. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) at least about 40% by weight of a normally liquid polyisocyanate composition containing at least 60% by weight of free isocyanate groups as the sole groups reactible with alcoholic hydroxyl groups, said polyisocyanate composition consisting essentially of reaction products of an aromatic polyisocyanate with an aliphatic polyhydroxy compound having a molecular weight of from about 62 to about 4000 and containing at least 2 alcoholic hydroxyl groups and in which the sole groups reactible with isocyanate groups are hydroxyl groups, each molecule of said reaction products containing at least 2 free isocyanate groups; (2) for each 100 parts of said polyisocyanate composition from about 0.32 part to 0.32+(90.0−T)(0.0372) parts by weight of a 2,4,6-tris(dialkylaminomethyl)phenol in which each alkyl group contains 1–4 carbon atoms, the amount of said phenol being insufficient to cause the viscosity of the solution to rise above 100 cps. at 25° C. in 30 minutes; and (3) a liquid halogenated hydrocarbon solvent having a flash point of at least 40° C. in an open cup at atmospheric pressure and which is a solvent for both the polyisocyanate composition and the phenol; and maintaining the solution in the pores of the formation until it has solidified.

17. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) about 40% to about 50% by weight of a normally liquid polyisocyanate composition containing at least 6% by weight of free isocyanate groups as the sole groups reactible with alcoholic hydroxyl groups, said polyisocyanate composition consisting essentially of the reaction product of a molar excess of an arylene diisocyanate with a polyhydroxy fatty acid triglyceride having a hydroxyl number above 100, each molecule of said reaction product containing at least 2 free isocyanate groups; (2) for each 100 parts of said polyisocyanate composition from about 0.32 part to 0.32+(90.0−T) (0.0372) parts by weight of a 2,4,6-tris(dialkylaminomethyl)phenol in which each alkyl group contains 1–4 carbon atoms, the amount of said phenol being insufficient to cause the viscosity of the solution to rise above 100 cps. at 25° C. in 30 minutes; and (3) a liquid halogenated hydrocarbon solvent having a flash point of at least 40° C. in an open cup at atmospheric pressure and which is a solvent for both the polyisocyanate composition and the phenol; and maintaining the solution in the pores of the formation until it has solidified.

18. The process for sealing a porous underground formation which is permeable to water and is at a temperature T of from about 15° C. to about 90° C. which comprises forcing into the pores of said formation a freshly prepared anhydrous solution having a Brookfield viscosity of up to 100 cps. at 25° C. and which solution consists essentially of (1) about 40% to about 50% by weight of a polyisocyanate composition containing at least 6% by weight of free isocyanate groups as the sole groups reactible with alcoholic hydroxyl groups, said polyisocyanate composition consisting essentially of the reaction product of about 50.7 parts by weight of a mixture of toluene-2,4-diisocyanate and toluene-2,6-diisocyanate with a mixture of about 41.9 parts by weight of castor oil and about 7.4 parts by weight of a polyethyleneether glycol having a molecular weight of about 200; (2) for each 100 parts of said polyisocyanate composition from about 0.32 part to 0.32+(90−T) (0.0372) parts by weight of 2,4,6-tris(dimethylaminomethyl)phenol, the amount of said phenol being insufficient to cause the viscosity of the solution to rise above 100 cps. at 25° C. in 30 minutes; and (3) a liquid halogenated hydrocarbon solvent having a flash point of at least 40° C. in an open cup at atmospheric pressure and which is a solvent for both the polyisocyanate composition and the phenol; and maintaining the solution in the pores of the formation until it has solidified.

No references cited.

UNITED STATES PATENT OFFICE

CERTIFICATE OF CORRECTION

Patent No. 2,889,883                        June 9, 1959

Arthur C. Santora

It is hereby certified that error appears in the above numbered patent requiring correction and that the said Letters Patent should read as corrected below.

Column 1, line 35, for "heardenable" read -- hardenable --; column 19, line 21, for "a ninert" read -- an inert --; line 43, for "groups or" read -- groups are --; column 21, line 44, for "60% read -- 6% --.

Signed and sealed this 13th day of October 1959.

(SEAL)

Attest:

KARL H. AXLINE

Attesting Officer

ROBERT C. WATSON
Commissioner of Patents